(12) United States Patent
Fournier et al.

(10) Patent No.: US 7,876,235 B2
(45) Date of Patent: Jan. 25, 2011

(54) VEHICLE INDICATOR ASSEMBLY

(75) Inventors: Joel Fournier, Cergy (FR); Stephane Voillot, Courdimanche (FR)

(73) Assignee: Johnson Controls Technology Company, Holland, MI (US)

(*) Notice: Subject to any disclaimer, the term of this patent is extended or adjusted under 35 U.S.C. 154(b) by 1032 days.

(21) Appl. No.: 11/637,224

(22) Filed: Dec. 11, 2006

(65) Prior Publication Data
US 2007/0126567 A1 Jun. 7, 2007

Related U.S. Application Data

(63) Continuation-in-part of application No. PCT/FR2005/000937, filed on Apr. 19, 2005, and a continuation-in-part of application No. PCT/FR2005/000938, filed on Apr. 19, 2005.

(30) Foreign Application Priority Data

Jun. 11, 2004 (FR) .................................. 0406307
Jun. 11, 2004 (FR) .................................. 0406308

(51) Int. Cl.
G08B 5/00 (2006.01)
G08B 5/36 (2006.01)
B60Q 1/00 (2006.01)
(52) U.S. Cl. ................... 340/815.45; 340/815.42; 340/815.55; 340/815.75; 340/815.83; 340/815.86; 340/688; 340/438
(58) Field of Classification Search .......... 340/438, 340/459, 461, 815.4, 815.45, 815.78, 688; 362/26
See application file for complete search history.

(56) References Cited

U.S. PATENT DOCUMENTS

| 4,163,428 | A | 8/1979 | Ishikawa |
| 6,224,222 | B1 | 5/2001 | Inoguichi et al. |
| 6,499,852 | B1 | 12/2002 | Kino et al. |
| 7,252,400 | B2* | 8/2007 | Clugston et al. ............... 362/26 |
| 7,586,404 | B2* | 9/2009 | Kageyama et al. ........... 340/461 |
| 2003/0202335 | A1 | 10/2003 | Calvert |
| 2007/0279243 | A1* | 12/2007 | Araki et al. ............. 340/815.58 |
| 2010/0007509 | A1* | 1/2010 | Ono ....................... 340/815.78 |

FOREIGN PATENT DOCUMENTS

| DE | 198 10 854 A1 | 9/1999 |
| EP | 1 132 721 A1 | 9/2001 |
| EP | 1 213 565 A1 | 6/2002 |
| JP | 2003-14508 | 1/2003 |

OTHER PUBLICATIONS

International Search Report for PCT/FR2005/000937, date of mailing Sep. 29, 2005, 2 pages.
International Search Report for PCT/FR2005/000938, date of mailing Dec. 19, 2005, 3 pages.

* cited by examiner

*Primary Examiner*—Julie Lieu
(74) *Attorney, Agent, or Firm*—Foley & Lardner LLP

(57) ABSTRACT

An indicator assembly for a vehicle instrument cluster is provided. The indicator assembly includes a ("floating") needle configured to rotate with respect to an indicator housing. The needle is selectively illuminable by a light source which may be mounted in various placements with respect the indicator assembly.

20 Claims, 2 Drawing Sheets

VEHICLE INDICATOR ASSEMBLY

CROSS-REFERENCE TO RELATED PATENT APPLICATIONS

The present application is a continuation-in-part, under 35 U.S.C. §§365(c) and 120, of International Applications: PCT/FR2005/000937 with an international filing date of Apr. 19, 2005 (which was published as WO 2006/005820 A1 in the French language); and PCT/FR2005/000938 with an international filing date of Apr. 19, 2005 (which was published as WO 2006/005821 A1 in the French language), the disclosures of which are herein incorporated by reference in their entirety into the present application.

BACKGROUND

The present application relates to dashboard indicators of a motor vehicle or other machine of locomotion.

BRIEF DESCRIPTION OF THE DRAWINGS

The indicator assembly will become more fully understood from the following detailed description, taken in conjunction with the accompanying drawings, wherein like reference numerals refer to like parts, and in which.

DETAILED DESCRIPTION

Figure 1:
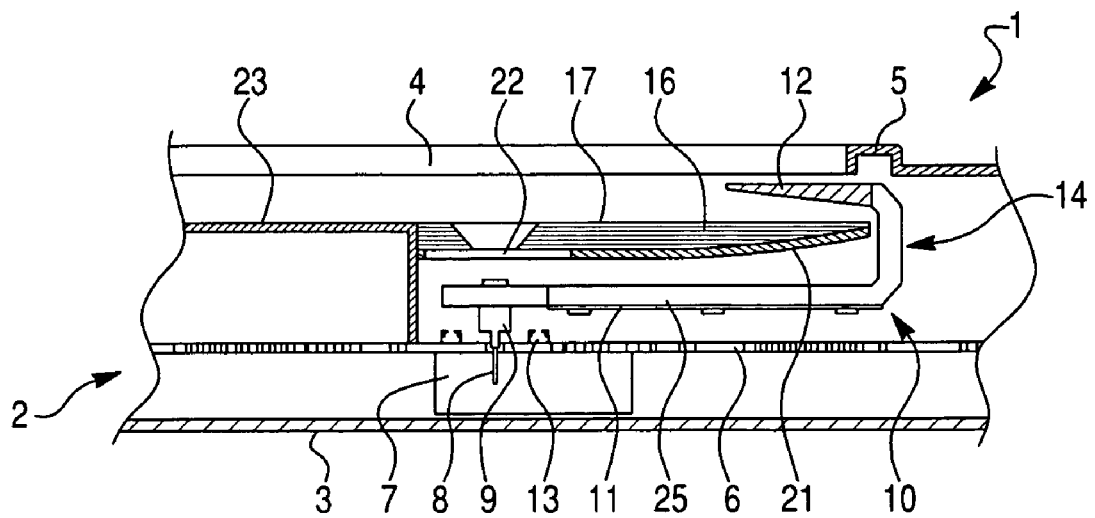
FIG. 1 is a cross-sectional view of an indicator assembly according to an exemplary embodiment.

One embodiment relates to an indicator comprises a movement, an indicator needle, rotated by the movement in front of a dial supporting indication characters (scale marks and numbers especially), the whole assembly mounted in a casing flange also used for protection and as an outer cover plate of the dial.

The applicant has sought to develop an indicator with a needle that is visible only on the periphery of the dial and that is of low cost.

Provided is a dashboard indicator comprising a monobloc needle mounted so as to rotate on a shaft of a drive motor, the needle comprising a bent arm terminated in an indicator end bent back towards its shaft to be moved in circular translation in front of a dial placed on a light duct, the dial and the light duct extending between the indicator end and the arm of the needle, hidden by the duct and the dial, lighting means being provided for the direct lighting of the arm and of the bent-back needle end and the indirect lighting, through the needle arm, of the light duct and hence of the dial.

Preferably, the indicator is mounted in a flange to which a protective pane extending at the front of the dial is attached.

Still preferably, the needle arm, forming a light guide, comprises, in a zone close to the shaft, at least one inclined face for the light to enter.

Advantageously, the lighting means comprise light-emitting diodes (LEDs).

The lighting of the needle and of the dial is thus easy and cheap to produce.

The present indicator assembly includes an indicator with a needle that is visible only on the periphery of the dial with the best possible lighting.

This problem is solved by a dashboard indicator comprising a needle mounted so as to rotate on a shaft of a drive motor, the needle comprising an arm extended by a bent finger with an indicator end bent back towards its shaft to be moved in circular translation in front of a dial placed on a light duct, the dial and the light duct extending between the indicator end and the arm of the needle, hidden by the duct and the dial, first lighting means being provided for the direct lighting of the needle end and second lighting means for the indirect lighting, through the needle arm, of the light duct and hence of the dial.

Preferably, the indicator is mounted in a flange to which a protective pane extending at the front of the dial is attached.

Still preferably, the first lighting means are on-board means arranged to be supplied with electric energy by means of a flex, a portion of which is wound about the shaft of the needle.

Again preferably, the needle finger is fitted to the end of the needle arm and the first lighting means are mounted on this arm end, at the entrance of the bent finger.

In this case, the flex extends along the arm.

Advantageously, the first lighting means comprise a three-colour light-emitting diode (LED) allowing the indicator end to change colour depending on its angular position.

The lighting of the indicator of the indicator assembly is good and can even be very powerful.

Figure 2:
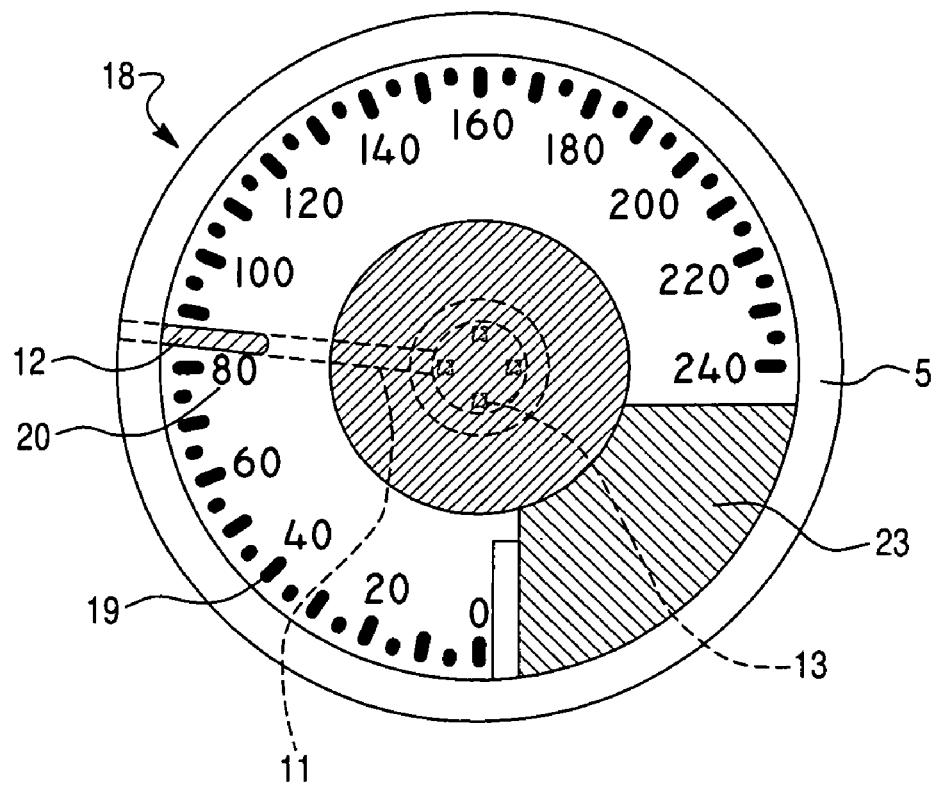
FIG. 2 is a front view of an indicator assembly according to an exemplary embodiment.

A first embodiment is now described with reference to FIGS. 1 and 2. Note that the indicator 1 that will now be described forms part of a much wider set of indicators built into a dashboard 2 or instrument cluster comprising a rear end 3, and a front protective pane 4 held in a casing flange 5 also serving as protection and here as an outer cover plate for the dial of the indicator 1 and certain others.

Between the protective pane 4 and the rear end 3, a printed circuit board 6 extends, at the rear of which the movement motor 7 of the indicator is mounted. The motor 7 supports a shaft 8 passing through the board 6 and onto which a spindle 9 of a monobloc indicator needle 10 is sleeve-fitted. The needle 10 comprises an arm 11, that extends parallel to the board 6, and that is bent twice at right angles to terminate in an indicator end 12 also extending parallel to the board 6, bent back towards the shaft 8 of the motor. The needle 10 is made in a material that conducts light and is also transparent to light.

A plurality of light-emitting diodes 13, in this instance four, is mounted on the board 6 around the shaft 8 of the motor 7 for rotating the needle 10.

The portion of the needle arm 11 extending on either side of the spindle 9 comprises, at its free end, a first outer inclined face 14 for the light to enter, to reflect in the needle, that is to say in its arm 11 and its indicator end 12, the light of one of the diodes 13. On the other side of the arm portion, relative to the spindle, a second inner inclined face 15 is arranged for the light to enter, also to reflect the light of one of the diodes 13 in the arm 11. Because of the transparency of the needle arm 11, these two zones, in which the inclined faces 14, 15 for the light to enter are made, also let the light of the diodes 13 pass through them to provide indirect lighting of the dial, as explained hereinafter, while these diodes 13 provide direct lighting of the needle 10.

A light duct or a light guide lens 16, designed to be lit indirectly by the diodes 13 through the needle arm 11, extends between the needle arm 11 and the indicator end 12. The anterior face 17 of the lens 16 serves as a front face of the indicator supporting the dial 18 (FIG. 2) which may be a Lexan mask on which have been silk-screen-printed, in this instance, a counter scale 19 and speed values 20. The lens 16 is placed in front of a bottom wall 21 serving as a light box, the wall being pierced with a window 22 in line with the needle spindle 9 and with the zone of the diodes 13 to allow the light of the diodes 13 to pass through. The bottom wall 21 is adjacent to another portion of light box 23 which also forms a zone for mechanically retaining the lens 16 and in which the needle 10 cannot move.

When the motor 7 rotates the indicator needle 10 on the shaft 8, the indicator end 12, that is the only portion of needle that is visible, the needle arm 11 being hidden by the lens 16 and the dial 18, is moved in circular translation on the periphery of the dial 18, along the counter scale 19.

By night, when the diodes 13 are lit, the indicator end 12 is perfectly illuminated.

Figure 3:
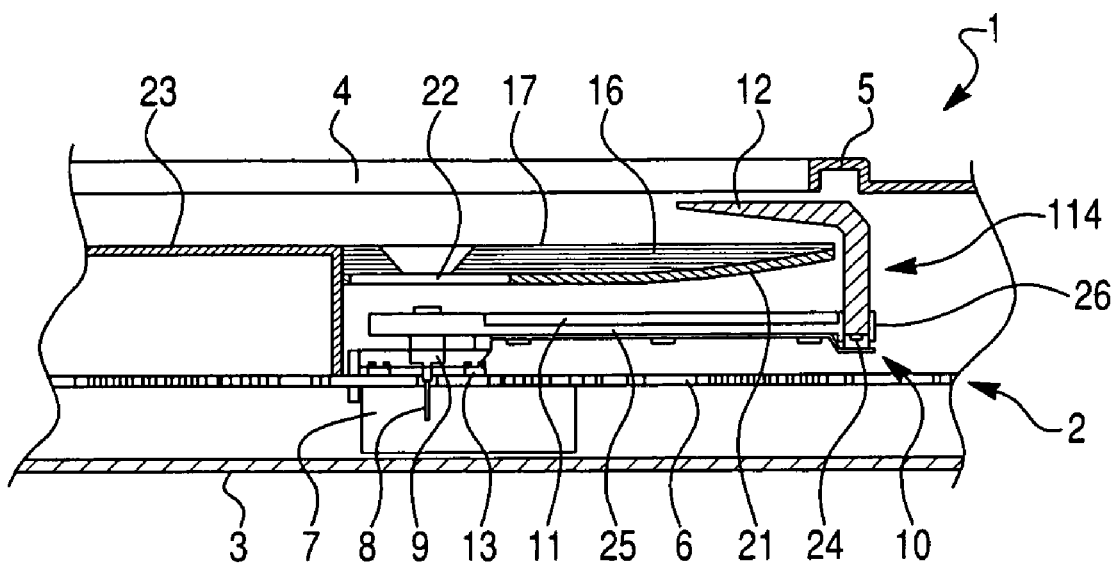
FIG. 3 is a cross-sectional view of an indicator assembly according to an exemplary embodiment.

The second embodiment is now described with reference to FIGS. 2 and 3. Note that the indicator 1, that will now be described, forms part of a much wider set of indicators built into a dashboard 2 comprising a rear end 3, and a front protective pane 4 held in a casing flange 5 also serving as protection and here as an outer cover plate for the dial of the indicator 1 and certain others.

Between the protective pane 4 and the rear end 3, a printed circuit board 6 extends, at the rear of which the motor 7 for moving the indicator is mounted. The motor 7 supports a shaft 8 passing through the board 6 and onto which a spindle 9 of an indicator needle 10 is sleeve-fitted. The needle 10 is in two parts and comprises an arm 11, extending parallel to the board 6, at the end 26 of which is fitted here a finger 114 bent at right angles to terminate in an indicator end 12 also extending parallel to the board 6, bent back towards the shaft 8 of the motor. The needle finger 114 is made of light-conductive material. As for the needle arm 11, it is made of material transparent to the light.

About the shaft 8 of the motor 7 for rotating the needle 10, a plurality of light sources which may be light-emitting diodes 13, in this instance four, is mounted on the board 6.

Slightly short of the inner end of the finger 114, turned towards the printed circuit board 6, a three-colour LED 24 is placed which is therefore on-board the needle 10. It is supplied from a flexible circuit (or flex) 25 which extends along the needle arm 11 and which, in conventional manner, is spiral-wound about the spindle 9 and the shaft 8 of the motor 7, the flex being electrically connected to the electric circuit supported by the board 6. The needle finger 114, with its indicator end 12, is directly lit by the LED 24. It being a three-colour LED, the colour of the indicator end may be modified depending on the angular position of the needle.

Because of the transparency of the needle arm 11, the portion of the arm extending on either side of the spindle 9 lets the light of the diodes 13 pass through it to provide an indirect lighting of the dial, as explained hereinafter.

Between the needle arm 11 and the indicator end 12, a light duct or a light guide lens 16 extends, designed to be lit indirectly by the diodes 13 through the needle arm 11. The anterior face 17 of the lens 16 serves as a front face of the indicator supporting the dial 18 (as shown in FIG. 2) which may have been silk-screen-printed, in this instance, a counter scale 9 and speed values 20. The lens 16 is placed in front of a bottom wall 21 serving as a light box, the wall being pierced with a window 22 in line with the needle spindle 9 and with the zone of the diodes 13 to allow the light of the diodes 13 to pass through. The bottom wall 21 is adjacent to another portion of light box 23 which also forms a zone for mechanically retaining the lens 16 and in which the needle 10 cannot move.

When the motor 7 rotates the indicator needle 10 on the shaft 8, the indicator end 12, that is the only portion of needle that is visible, the needle arm 11 being hidden by the lens 16 and the dial 18, is moved in circular translation on the periphery of the dial 18, along the counter scale 19.

By night, when the diodes 13 are lit, the indicator end 12 is perfectly illuminated.

What is claimed is:

1. An indicator assembly for a dashboard, comprising:
a monobloc needle mounted to rotate on a shaft of a drive motor, the needle comprising a bent arm terminated in an indicator end that is bent back towards the shaft, wherein the needle is configured to be moved in circular translation in front of a dial placed on a light duct, and wherein the dial and the light duct extend between an indicator end and the arm of the needle, hidden by the duct and the dial; and
a lighting source configured to provide direct lighting to the arm and the indicator end that is bent back and further configured to provide indirect lighting, through the needle arm, to the light duct of the dial.

2. The indicator assembly of claim 1, further comprising: a casing flange to which a protective pane is attached.

3. The indicator assembly of claim 1, wherein the needle arm forming a light guide comprises, in a zone close to the shaft, at least one inclined face for light to enter.

4. The indicator assembly of claim 1, wherein the lighting source comprises a light-emitting diode.

5. A dashboard indicator, comprising:
a needle mounted so as to rotate on a shaft of a drive motor, wherein the needle comprises an arm extended by a bent finger with an indicator end bent back towards the shaft of the drive motor to be moved in circular translation in front of a dial placed on a light duct, and wherein the dial and the light duct extend between an indicator end and the arm of the needle, hidden by the duct and the dial;
a first lighting source configured to provide direct lighting to the indicator end that is bent back; and
a second lighting source configured to provide indirect lighting, through the needle arm, to the light duct of the dial.

6. The indicator assembly of claim 5, further comprising: a casing flange to which a protective pane is attached.

7. The indicator assembly of claim 5, wherein the first lighting source is on-board, arranged to be supplied with electric energy by a flex, a portion of which is wound about the shaft of the drive motor.

8. The indicator assembly of claim 7, wherein the needle finger is fitted to the end of the needle arm and the first lighting source is mounted on the arm end at the entrance of the bent finger.

9. The indicator assembly of claim 8, wherein the flex extends along the needle arm.

10. The indicator assembly of claim 5, wherein the first lighting source comprises a tri-colour LED.

11. An indicator assembly for use in a vehicle instrument cluster, comprising:
a housing;
a light duct mounted to the housing;
a light source providing light to the light duct;
a needle pivotally coupled to the housing at a first end; and
an electric motor coupled to the housing configured to rotate the needle with respect to the housing, wherein the needle is bent so that the first end of the needle is hidden behind the light duct and a second end overlies the light duct.

12. The indicator assembly of claim 11, wherein the housing includes a dial arched with respect to a rotational path of the needle.

13. The indicator assembly of claim 11, wherein the needle includes at least one reflective surface configured to transfer light from the light source located at a first end of the needle to a second end of the needle.

14. The indicator assembly of claim 11, wherein the light duct is configured to disperse light from the light source.

15. The indicator assembly of claim 1, further comprising: a lens coupled to the housing and configured to transfer light received from the light source, wherein the lens is configured to at least partially restrict rotation of the needle with respect to the housing.

16. An indicator assembly for use in a vehicle instrument cluster, comprising:
 a housing;
 a light duct mounted to the housing;
 a light source providing light to the light duct;
 a needle pivotally coupled to the housing and at least partially mounted behind the light duct;
 an electric motor coupled to the housing configured to rotate the needle with respect to the housing;
 a flexible circuit configured to rotate with the needle, wherein the light source is connected to the flexible circuit at a first end of the needle and mounted to the needle at a second end of the needle and wherein the needle is bent so that the first end of the needle is hidden behind the light duct and the second end of the needle overlies the light duct.

17. The indicator assembly of claim 16, wherein the housing includes a dial arched with respect to a rotational path of the needle.

18. The indicator assembly of claim 16, wherein the indicatory assembly includes a plurality of light sources providing light to the needle, and wherein the flexible circuit is configured to selectively power at least one of the plurality of light sources.

19. The indicator assembly of claim 18, wherein the circuit board is configured to power the plurality of light sources as a function of the angular position of the needle with respect to the housing.

20. The indicator assembly of claim 18, wherein the plurality of light sources are provided in at least two different colors.

* * * * *